United States Patent [19]

Niiho et al.

[11] Patent Number: 4,523,108

[45] Date of Patent: Jun. 11, 1985

[54] AVERAGING CIRCUIT

[75] Inventors: Masaaki Niiho; Takuo Itagaki, both of Tokyo, Japan

[73] Assignee: Asahi Kogaku K.K.K., Tokyo, Japan

[21] Appl. No.: 400,532

[22] Filed: Jul. 21, 1982

[30] Foreign Application Priority Data

Jul. 22, 1981 [JP] Japan ................................ 56-114599

[51] Int. Cl.³ ........................ H03K 5/01; H03K 5/153; G01C 3/08
[52] U.S. Cl. ..................................... 307/353; 307/261; 307/358; 307/520; 328/151; 356/5
[58] Field of Search ............... 307/353, 352, 358, 261; 328/151, 162, 165; 307/490, 498, 520, 350, 311; 356/4, 5

[56] References Cited

U.S. PATENT DOCUMENTS 3,693,100 9/1972 Brown et al. .................... 328/151
3,911,212 10/1975 Yoshizawa et al. .............. 328/151

Primary Examiner—John Zazworsky
Attorney, Agent, or Firm—Sughrue, Mion, Zinn, Macpeak & Seas

[57] ABSTRACT

An averaging circuit includes a number of sample/hold circuits which cyclically sample/hold an input signal, the outputs of the sample hold circuits being added and applied to a comparator. A further sample/hold circuit sample/holds an internal input signal at an increased rate and the output thereof is amplified by a factor equal to the number of cyclically operated sample/hold circuits before being applied as the other input to the comparator.

7 Claims, 8 Drawing Figures

FIG. 1
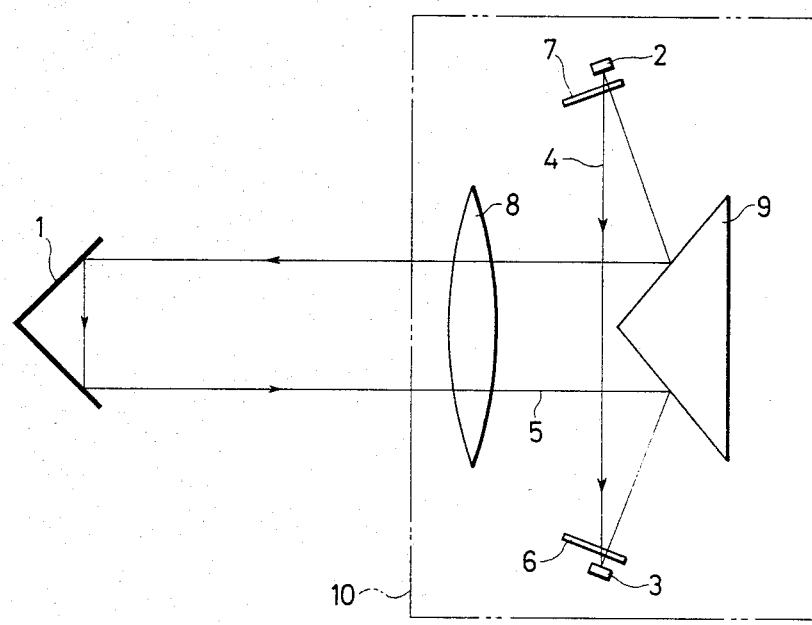
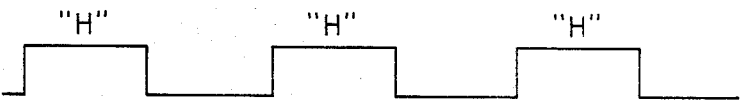
FIG. 2a
FIG. 2b
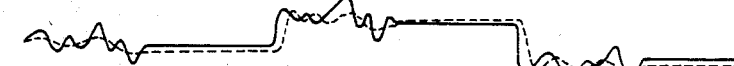
FIG. 2c
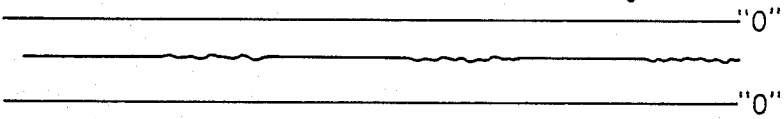
FIG. 2d

AVERAGING CIRCUIT

BACKGROUND OF THE INVENTION

This invention relates to averaging circuits for processing signals which are periodically and intermittently input, and more particularly to an averaging circuit for an optical intensity signal received by an optical wave range finder.

One example of the optical system of an optical wave range finder is as shown in FIG. 1. A modulated light beam is emitted from a light emitting diode 2 in the optical wave range finder 10. The modulated light beam is applied through a prism 9 and an objective lens 8 to a reflector 1 such as a corner cube placed at a measurement point. The modulated light beam 5 reflected by the reflector 1 is received by a light receiving element 3, and the phase difference between the emitted and received modulated light beams is measured and converted into a distance.

In this case, in order to eliminate a phase measurement error which is caused in the signal receiving circuit provided in the rear stage of the light receiving element, a method is employed in which a calibration light beam 4 (hereinafter referred to as "the internal light beam") is provided in the optical wave range finder 10, and the intensities of the internal light beam 4 and the modulated light beam 5 reflected from the reflector 1 (hereinafter referred to as "the external light beam") are controlled by arranging a light quantity adjuster 6 such as a variable density filter or a diaphragm in one or two optical paths as shown in FIG. 1, so that the external light beam 5 and the internal light beam 4 as received are made equal in intensity.

The internal light beam and the external light beam 5 are alternately produced by means of a light chopper 7 or the like. Therefore, the production sequence of the internal light beam 4 and the external light beam 5 is as shown in FIGS. 2a and 2b.

FIG. 2a shows a pulsive external light beam, the light beam being provided at times indicated by "H". FIG. 2b shows the pulsive internal light beam, this light beam also being provided at the times indicated at "H" in FIG. 2b. The external light beam 5 and the internal light beam 4 alternately provided in this fashion are received by the light receiving element 3. The intensities of the light beams 4 and 5 thus received are detected (the detection signals being referred to as "light quantity signals" hereinafter), and the intensities thus detected are made equal by means of the light quantity adjuster 6. This control is carried out manually or automatically. In order to control the light quantity adjuster 6 with respect to the production sequence of the external and internal light beams 5 and 4, in general, hold circuits for the light quantity signals of the external light beam 5 and the internal light beam 4 are disposed, so that, during reception of the external light beam 5, the light quantity signal of the external light beam 5 being received is compared with the light quantity signal of the internal light 4 which was held at the time of the internal light beam 4. Conversely, at the time the internal light beam is received, the internal light quantity signal being received is compared with the external light quantity signal previously held. A comparison output signal representative of the difference between the light quantity signals or their coincidence is used to control the light quantity adjuster 6. When coincidence is obtained, the light quantity adjuster 6 is stopped. In the case of manual control, the comparison output signal is displayed to inform the operator of the aforementioned difference or coincidence. In the case of automatic control, feedback control is effected according to the comparison output signal. In such a case, the internal light beam 4 is not affected by atmospheric conditions because it is inside the optical wave range finder, but the external light beam 5 is affected thereby (cf. FIG. 2d). Especially in the case when there is schlieren, the intensity of the external light beam received is greatly varied, as a result of which the external light quantity signal varies greatly as indicated by the solid line in FIG. 2c. Accordingly, the comparison output signal is affected so greatly that the display or control is adversely affected.

In order to prevent the comparison output signal from being affected as described, an averaging circuit such as an integration circuit or a time constant circuit is used, so the external light beam signal in one period is averaged as indicated by the dotted light in FIG. 2c, or the range of coincidence is increased, i.e., the control gain is decreased. However, the former method is not effective against variations over many periods, and the latter method is low in measurement accuracy, being poor in coincidence accuracy.

SUMMARY OF THE INVENTION

Accordingly, an object of the invention is to provide a circuit in which the above-described difficulties have been eliminated and which is high in coincidence accuracy and averages variations over a number of periods.

BRIEF DESCRIPTION OF THE DRAWINGS

FIG. 1 is an explanatory diagram showing the optical system of an optical wave range finder;

FIG. 2a is a waveform diagram showing an external light beam pulse;

FIG. 2b is a waveform diagram showing an internal light beam pulse;

FIG. 2c is a waveform showing an external light quantity signal;

FIG. 2d is a waveform diagram showing an internal light quantity signal;

DETAILED DESCRIPTION OF THE PREFERRED EMBODIMENTS

Figure 3:
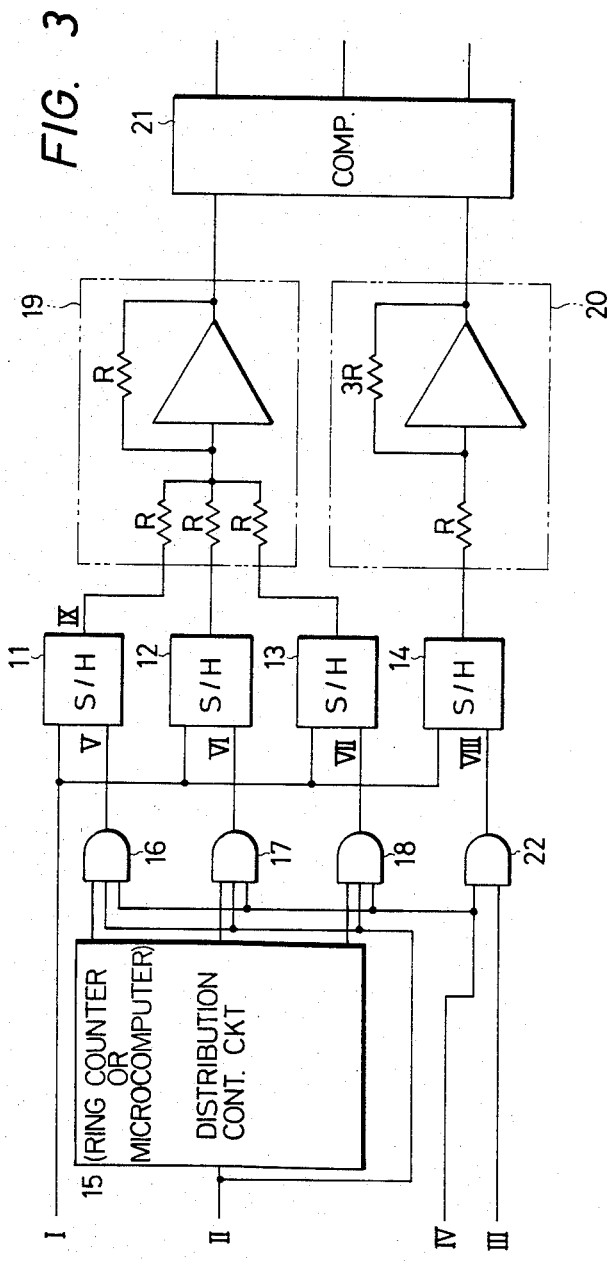
FIG. 3 is a circuit diagram, partly as a block diagram, showing one example of an averaging circuit according to this invention.
Figure 4:
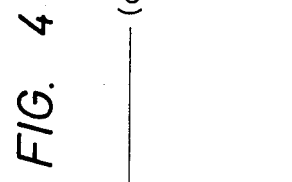
FIG. 4 is a circuit diagram showing one example of the sample and hold circuits employed in the circuit of FIG. 3; and, FIG. 5 is a time chart showing signals at essential sections of the averaging circuit of FIG. 3.
Figure 5:
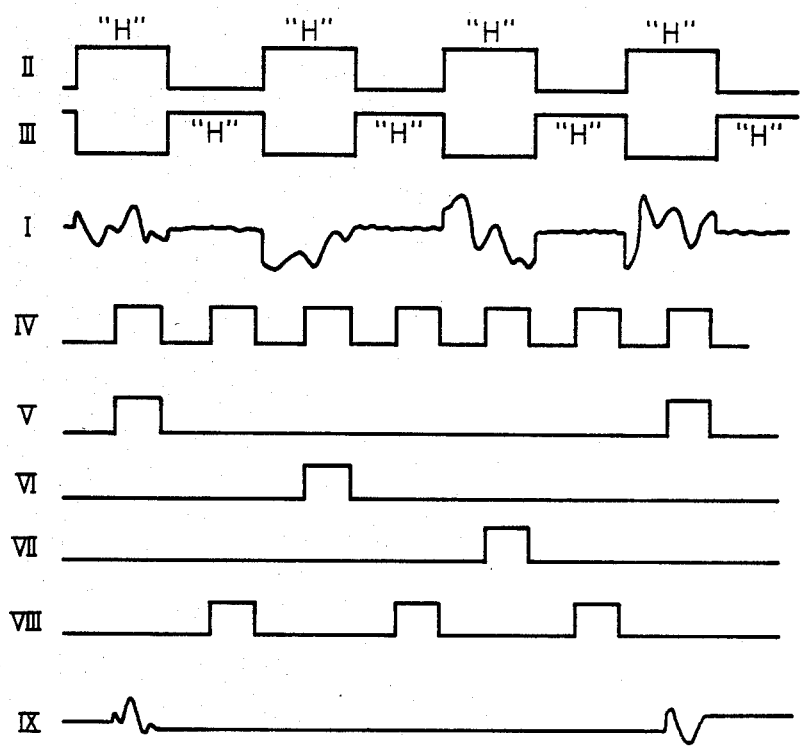

FIG. 3 shows one example of a circuit for processing an internal light quantity signal and an external light quantity signal which includes one example of an averaging circuit according to the invention. FIG. 5 is a time chart showing the signals at essential sections of the circuit of FIG. 3. In FIGS. 3 and 5, like signals are designated by like reference characters (or names). In FIG. 3, reference numerals 11, 12, 13 and 14 designate generally employed sample and hold circuits which are as shown in FIG. 4. Each sample and hold circuit has an analog signal input (a), a sample and hold control input (b), and a sample and hold output (c). Further in FIG. 4, reference numeral 23 designates a capacitor.

A light quantity signal I is connected to the analog signal inputs (a) of the sample and hold circuits 11, 12 and 13, and is sampled and held according to the sample and hold control inputs (b) thereof. The outputs of the circuits 11 through 13 are applied to an adder 19 having a gain of one (1). The sample and hold control inputs V, VI and VII of the sample and hold circuits 11, 12 and 13 are the outputs of AND circuits 16, 17 and 18, which receive the outputs of distribution control circuit 15, an external specifying pulse II and a sample signal IV. Therefore, the sample and hold circuits 11, 12 and 13 sample and hold the external light quantity signal I according to the sample signal IV when specified by the outputs of the distribution control circuit 15. The distribution control circuit 15 operates to output the count value of a ternary ring counter. The count value is of the ring type; 0, 1, 2, 0, 1, 2, and so on. The count clock input II is similar to that shown in FIG. 2a. As the distribution control circuit operates as described above, the outputs of the AND circuits 16, 17 and 18 (i.e., the sample and hold control inputs) are distributed, being subjected to ⅓ frequency division every period of the external specification pulse as is apparent from parts V, VI and VII of FIG. 5. One example of the outputs of the sample and hold circuit 11 thus obtained is as shown in part IX of FIG. 5.

On the other hand, the light quantity signal I is similarly applied to the analog signal input of the sample and hold circuit 14 which samples and holds the internal light quantity signal. The output of an AND circuit 22 is connected to the sample and hold control input of the circuit 14. The AND circuit 22 receives the internal specifying signal III and the sample signal IV, to provide the output signal VIII. Therefore, the output VIII, being produced at every period of the internal specification pulse, samples and holds the internal light quantity signal.

The outputs of the sample and hold circuits 11, 12 and 13 are applied to the adder 19 where they are subjected to addition. In this case, the output of the adder 19 is equivalent to three times the external light quantity signal. In order to allow the internal light quantity signal to coincide with the output of the adder 19, i.e., in order to increase the output of the sample and hold circuit 14 by the factor "three", the output of the sample and hold circuit 14 is applied to an amplifier 20. The output of the adder 19 and the output of the amplifier 20 are applied to a comparator 21, where they are subjected to comparison, i.e., the external light quantity signal and the internal light quantity signal are subjected to comparison. As a result, the comparator 21 outputs a comparison result representation of whether one signal is greater, smaller than, or equal to the other.

The signals II, III and IV in FIG. 3 are outputted with suitable timing by means of a microprocessor or the like. The same effects as described above can be obtained by employing a microcomputer as the distribution control circuit 15.

With the above-described arrangement, the variation of the external light quantity signal in one period thereof is reduced; that is, it is reduced to a third with respect to the output of the adder 19. Therefore, not only the variation in each period, but also the variation of the value held in each period is averaged.

As is apparent from the above description, a plurality of circuits for sampling and holding the external light quantity signal are operated in such a manner that the circuits are switched every period, and the outputs of the plurality of sample and hold circuits are added to be subjected to comparison, whereby the effect of the variation in each period to the addition output is reduced, so that the variations of the signals over a number of periods are reduced and the display or control is made stable without increasing the range of coincidence.

As was described above, in the case where the signals inputted periodically or intermittently are variable, the averaging circuit according to the invention, unlike the conventional averaging circuit, can average the variation of a signal over a number of periods. Thus, the averaging circuit of the invention can be effectively applicable to an optical wave range finder employing such signals.

What is claimed is:

1. An averaging circuit for processing an input signal which is intermittent and has a period, comprising,
    first through nth sample and hold circuit means for sampling and holding said input signal in response to sample pulses applied thereto, respectively,
    distribution means for generating and cyclically applying sample pulses to said first through said nth sample and hold circuit means, to cause said first through said nth sample and hold circuit means to sample said input signal during n successive periods thereof, respectively,
    an adder for adding the outputs of said first through nth sample and hold circuit means, wherein said distribution control circuit comprises a ring counter.

2. An averaging circuit for processing an input signal which is intermittent and has a period, comprising,
    first through nth sample and hold circuit means for sampling and holding said input signal in response to sample pulses applied thereto respectively,
    distribution means for generating and cyclically applying sample pulses to said first through said nth sample and hold circuit means, to cause said first through said nth sample and hold circuit means to sample said input signal during n successive periods thereof, respectively,
    an adder for adding the outputs of said first through nth sample and hold circuit means, wherein said distribution control circuit comprises a microcomputer.

3. A circuit for processing an input signal which is intermittent and has a period, comprising,
    first through nth sample and hold circuit means for sampling and holding said input signal in response to sample pulses applied thereto, respectively,
    distribution means for generating and cyclically applying samples pulses to said first through said nth sample and hold circuit means, to cause said first through said nth sample and hold circuit means to sample said input signal during n successive periods thereof, respectively,
    an adder for adding the outputs of said first through nth sample and hold circuit means,
    an additional sample and hold circuit means for sampling and holding a second input signal, which is intermittent and has a period, once per period of said second input signal, and
    means for comparing the signals held by said additional sample and hold circuit means with the output from said adder.

4. A circuit as claimed in claim 3, wherein said means for comparing comprises an amplifier for receiving an output of said additional sample and hold circuit means, the amplification factor of said amplifier being related to the number of said first through nth sample and hold circuit means.

5. A circuit as claimed in claim 4, wherein said means for comparing further comprises comparator means receiving outputs of said amplifier and said adder.

6. A circuit as claimed in claim 3 wherein said input signal to said first through nth sample and hold circuit means and said second input signal are signals which have the same periodicity but intermittently occuring during non-overlapping times of the same period.

7. A circuit as claimed in claim 6 wherein said first and second input signals are an external light quantity signal and an internal light quantity signal, respectively, derived from an optical range finder.

* * * * *